United States Patent
Sulc et al.

(10) Patent No.: US 6,617,373 B2
(45) Date of Patent: Sep. 9, 2003

(54) OPHTHALMIC LENSES AND COMPOSITIONS AND METHODS FOR PRODUCING SAME

(75) Inventors: Jiri Sulc, Corona Del Mar, CA (US); Zuzana Krcova, La Jolla, CA (US)

(73) Assignee: Ocular Sciences, Inc., Concord, CA (US)

( * ) Notice: Subject to any disclaimer, the term of this patent is extended or adjusted under 35 U.S.C. 154(b) by 0 days.

(21) Appl. No.: 10/015,460

(22) Filed: Dec. 13, 2001

(65) Prior Publication Data

US 2002/0091175 A1 Jul. 11, 2002

Related U.S. Application Data

(62) Division of application No. 09/551,297, filed on Apr. 18, 2000, now Pat. No. 6,372,815.

(51) Int. Cl.[7] ............................. C08K 5/06; C08F 26/10
(52) U.S. Cl. .................... 523/108; 523/111; 525/326.9; 526/318.42
(58) Field of Search ................................ 523/108, 111; 525/326.9; 526/318.42

(56) References Cited

U.S. PATENT DOCUMENTS

| | | |
|---|---|---|
| 5,210,111 A | 5/1993 | Goldenberg et al. |
| 5,241,006 A | 8/1993 | Iqbal et al. |
| 5,270,415 A | 12/1993 | Sulc et al. |
| 5,362,420 A * | 11/1994 | Itoh et al. ................ 525/326.9 |
| 5,391,669 A | 2/1995 | Sulc et al. |
| 5,397,848 A | 3/1995 | Yang et al. |
| 5,468,811 A | 11/1995 | Moro et al. |
| 5,484,863 A | 1/1996 | Molock et al. |
| 5,490,960 A | 2/1996 | Nunez et al. |
| 5,824,719 A | 10/1998 | Kunzler et al. |

FOREIGN PATENT DOCUMENTS

| | | |
|---|---|---|
| EP | 0351364 | 1/1990 |
| WO | 0002937 | 1/2000 |

* cited by examiner

*Primary Examiner*—James J. Seidleck
*Assistant Examiner*—Olga Asinovsky
(74) *Attorney, Agent, or Firm*—Stout, Uxa, Buyan & Mullins, LLP; Frank J. Uxa

(57) ABSTRACT

Ophthalmic lenses, such as corneal contact lenses, include a lens body made of a composition including a lens body made of a composition including a first crosslinked polymer material which is water swellable, and a second polymeric material, other than the first material, selected from water soluble polymeric materials, water swellable polymeric materials and mixtures thereof. The second material is physically immobilized by the first material. Such lenses provide increased water retention and/or increased water content and/or increased modulus and/or reduced friction which increases lens wearer comfort. Compositions and methods for providing such lenses and compositions are also provided.

19 Claims, No Drawings

OPHTHALMIC LENSES AND COMPOSITIONS AND METHODS FOR PRODUCING SAME

This is a division of application Ser. No. 09/551,297, filed Apr. 18, 2000 now U.S. Pat. No. 6,372,815.

BACKGROUND OF THE INVENTION

The present invention relates to ophthalmic lenses, compositions useful for inclusion in such lenses, and methods for producing such lenses and compositions. More particularly, the invention relates to polymeric ophthalmic lenses, such as corneal contact lenses and the like, polymeric compositions useful included in ophthalmic lenses and methods for producing such lenses and compositions.

Hydrophilic lenses, such as corneal contact lenses, are often formed from covalently cross-linked polymers based on hydrophilic derivatives of acrylic or methacrylic acid, hydrophilic vinylic monomers such as vinylpyrrolidone, and the like. When hydrated, these hydrophilic cross-linked polymers can be referred to as hydrogels and include relatively large quantities of water without dissolving. Such polymers may include minor amounts of polymeric units derived from less hydrophilic, or even hydrophobic, monomers to confer mechanical strength and other useful properties.

Although conventional hydrophilic polymer or hydrogel lenses are useful and effective, some problems do present themselves, from time to time. For example, conventional hydrophilic contact lenses, particularly after long periods of in-the-eye use, do have a tendency to lose water content. Reduction in water content tends to detrimentally affect the physical structure and/or optical properties of the lens. This reduction in water content can lead to lens wearer discomfort and even to actual irritation or other damage to the eye. In addition, such conventional lenses may lose lubricity or exhibit relatively large amounts of friction with the corneal surface, which also can cause lens wearer discomfort and/or eye irritation and the like. Such reduced lens water content and/or reduced lubricity can result in the lens wearer perceiving that his/her eye is dry. Such "dry eye" phenomenon can be overcome through the use of eye drops and/or lubricants. However, it would be advantageous to reduce or even substantially eliminate these problems without the need for eye drops or separate lubricants.

In short, there is a continued need for enhanced ophthalmic lenses, e.g., corneal contact lenses, enhanced materials of construction for such lenses and enhanced methods for producing such lenses and materials.

SUMMARY OF THE INVENTION

New ophthalmic lenses, such as corneal contact lenses, polymeric compositions useful for inclusion in such ophthalmic lenses, and methods for producing such lenses and polymeric compositions have been discovered. The present invention provides substantial benefits in terms of reducing discomfort and/or irritation to the wearer of the present lenses as a result of wearing such lenses, for example, relative to wearing a conventional lens. The present lenses, which include the present compositions, preferably provide for increased water content and/or increased water retention and/or reduced surface evaporation of water. The present contact lenses exhibit reduced friction toward hydrophilic surfaces such as the cornea. Further, such lenses have effective, and even enhanced, modulus, and structural and optical stability, for example, relative to conventional lenses. A lens wearer can often wear the present lenses effectively for relatively longer periods of time and/or with reduced or no harmful effects relative to conventional lenses.

The present methods for producing polymeric compositions and lenses are relatively straightforward to practice and provide compositions and lenses which have controlled characteristics useful in producing substantial benefits, for example, one or more the benefits of the present lenses described herein.

In one broad aspect, the present invention is directed to ophthalmic lenses comprising lens bodies. Such lens bodies comprise compositions including a first polymer material, preferably a first cross-linked polymer material, which is water swellable; and a second polymeric material, other than the first material, selected from water soluble polymeric materials, water swellable polymeric materials and mixtures thereof. The second material is immobilized, preferably physically immobilized, by the first material. In one embodiment, for example, with the second material being a water soluble material, the composition included in the present lenses preferably may be considered a pseudo-interpenetrating network. With the second material selected from water swellable materials, the composition in the lenses preferably may be considered a true interpenetrating network of the first material and the second material.

Without wishing to limit the invention to any particular theory of operation, it is believed that such structures of the combinations of first materials and second materials in accordance with the present invention provide the effective and surprising properties and benefits to the present lenses.

The first material and the second material are chosen or selected to provide one or more desired properties, for example, lenses with one or more desired properties which provide one or more benefits to the lenses and/or the lens wearers.

Advantageously, the lens bodies in accordance with the present invention, when hydrated, exhibit one or more of the following beneficial characteristics or properties:

increased water retention relative to a substantially identical lens body without the second material;

increased equilibrium water content relative to a substantially identical lens body without the second material;

reduced surface evaporation of water relative to a substantially identical lens body without the second material;

increased modulus or tensile strength relative to a substantially identical lens body without the second material; and a reduced coefficient of friction relative to a substantially identical lens body without the second material.

Lenses, such as contact lenses, which include and/or retain increased amounts of water are effective in providing increased lens wearer comfort and/or reducing the risk of irritation and/or other damage to the eye of the lens wearer. Reducing the friction between the lens and the eye, for example, the cornea of the eye, such as by maintaining an increasing water content and/or reducing coefficient of friction, also increases comfort and reduces risk of irritation. Lenses with increased modulus or tensile strength have longer useful lives and/or can be made more thin to enhance lens wearer comfort. In addition, lenses with such reduced coefficients of friction are able to be worn without the lens wearer perceiving excessive eye dryness. The present lenses often have what may be termed a slippery or lubricious feel, for example, because of the increased water content and/or the reduced coefficient of friction. In addition, by selecting suitable monomers from which the first material and the second material are made, the present lenses can advantageously have a reduced tendency to accumulate proteinaceous and other deposit material.

In another broad aspect of the present invention, methods for producing ophthalmic lenses. In general, such methods comprise:

providing a lens body comprising a lens composition including a first polymer material, preferably a first crosslinked polymer material, which is water swellable;

introducing a monomeric component into the lens body, the monomeric component preferably being soluble in at least one member selected from the group consisting of water, water miscible solvents and mixtures thereof; and subjecting the monomeric component in the lens body to effective conditions, for example, effective polymerization conditions, to form a second polymeric material selected from water soluble polymeric materials, water swellable polymeric materials and mixtures thereof. The second material is immobilized, preferably physically immobilized, by the first material.

In one embodiment, the monomeric component is substantially free of a cross-linker. Alternately, the monomeric component may include an effective amount of a cross-linker.

In addition, the monomeric component may include an amount of a polyfunctional monomer, for example, a di-functional monomer, effective to increase the molecular weight, such as by increasing the chain length, of the second material relative to a similar polymeric material, for example, produced without the polyfunctional monomer. In this embodiment, the polyfunctional monomer preferably is employed in embodiments with the resulting or final second material is to be water soluble.

Each and every feature described herein, and each and every combination of two or more of such features, is included within the scope of the present invention provided that the features included in such a combination are not mutually inconsistent.

DETAILED DESCRIPTION

The present ophthalmic lenses may be of any suitable form, for example, adapted to be placed on or in a mammalian or human eye. Thus, the present lenses can be corneal contact lenses, corneal onlays, corneal inlays, intraocular lenses and the like. However, the present invention is particularly useful with regard to corneal contact lenses or simply contact lenses, which are adapted to be repeatedly placed on and removed from the surface of the cornea. Although the description herein emphasizes contact lenses, it is to be understood that the invention is not limited thereto.

The lens bodies of the present ophthalmic lenses comprise a first polymer material, preferably a first cross-linked polymer material, which is water swellable; and a second polymeric material, other than the first material, selected from water soluble polymeric materials, water swellable polymeric materials and mixtures thereof. The second material is immobilized, preferably physically immobilized, by the first material. Preferably, the second material is substantially not covalently bonded to the first material.

Preferably, the lens bodies of the present ophthalmic lenses exhibit at least one of increased water retention, increased equilibrium water content, reduced surface evaporation of water, increased modulus or tensile strength and a reduced coefficient of friction relative to a substantially identical lens body without the second material. As discussed in more detail elsewhere herein, each of these features, alone or in any combination, is effective to provide properties to the present lenses which are of substantial benefit to the lenses themselves and/or to the wearers of the lenses.

In one useful embodiment, the second material is substantially uncross-linked. Alternately, the second material may be cross-linked. In one embodiment, the second material preferably comprises homopolymers, although copolymers including units of two or more monomers may be employed.

The first material is present in the present lens bodies or compositions in an amount effective to hold or immobilize, for example, physically hold or immobilize, the second material, in particular when the lens bodies or compositions are hydrated at equilibrium conditions. Such first material preferably is present in an amount in a range of about 10% to about 99.9% by weight, more preferably about 60% to about 99.9% by weight, based on the water-free weight of the ophthalmic lens or of the composition comprising the first material and the second material. The second material is present in the present lens or composition, for example, in an amount effective to provide at least one benefit, e.g., as described elsewhere herein, to the lens or composition. The second material preferably is present in an amount in a range of about 0.1% to about 90% by weight, more preferably about 0.1% to about 40% by weight, based on the water-free weight of the ophthalmic lens or composition comprising the first material and the second material.

In a very useful embodiment, the first material is selected from hydrogel-forming polymers and mixtures thereof. For example, the first material may include units, that is polymer units derived from monomers used to produce the first material, derived from at least hydrophilic monomeric component, for example, an at least one hydrophilic ethylenically unsaturated monomer. The first material preferably is present as a hydrogel in the presence of an effective amount of water to swell the first material.

The first material more preferably includes units derived from one or more members selected from hydroxyalkyl acrylates, hydroxyalkyl methacrylates, N-vinylpyrrolidone, acrylamides, vinyl alcohol, hydrophilic polyurethane precursors, acrylates, methacrylates, substituted counterparts thereof and mixtures thereof.

As used herein, the term "substituted counterparts thereof" refers to entities, e.g., compounds, which include one or more substituents and are effective to function in the present invention substantially like the unsubstituted entities, for example, the compounds listed herein.

Conventional cross-linking monomeric components may be employed in amounts effective to produce the desired degree of cross-linking of the first material.

The first material may be selected from materials which are well known and conventionally used in producing hydrophilic or soft contact lenses. For example, the first material may be produced from a mixture of monomers including methacrylic acid, 2-hydroxyethyl methacrylate (HEMA), and ethyleneglycol dimethacrylate cross-linking monomer together with a polymerization initiator, such as a thermal initiator. Such mixture can be placed in molds having lens shaped, for example, contact lens shaped, cavities and subjected to elevated temperature, for example, in a range of about 60° C. to about 120° C., to effect thermopolymerization of the monomer mixture and form lens blanks, for example, contact lens blanks. Preparation of lens blanks by UV radiation in the presence of a photoinitiator such as diethoxyacetophenone, 1-hydroxycyclohexyl phenyl ketone, 2,2-dimethoxy-2-phenylacetophenone, phenothiazine, diisopropylxanthogen disulfide, benzoin, benzoin methyl ether, other benzoin derivatives, 2,2'-azo-bis-isobutyro-nitrile and the like and mixtures thereof is also a useful method.

The first material may be cationic, anionic, nonionic or a material having a substantially balanced cationic/anionic charge, for example, formed from a composition comprising a cationic-anionic pair of monomers and hydrophilic and/or hydrophobic monomers. See Sulc et al U.S. Pat. No. 5,270,415, the disclosure of which is incorporated in its entirety herein by reference.

One advantage of ophthalmic lenses including a first material, and preferably a second material as well, having a substantially balanced cationic/anionic charge is that such lenses have a significantly reduced tendency to accumulate proteinaceous materials, cell fragments, and other soilants or deposit materials on the surfaces of the lenses. This highly advantageous property is relative to lenses manufactured from hydrogels having a significant or substantial cationic or anionic surface charge. Moreover, such reduced deposit accumulation tendency is in addition to the other benefit or benefits, as described herein, of the present invention.

Suitable anionic monomeric components useful in producing the first material include, but are not limited to, carboxylic acids such as acrylic acid, methacrylic acid, itaconic acid, maleic acid, 2-vinylpropionic acid, 4-vinylpropionic acid and the like and mixtures thereof; and sulfonic acids such as methacryloyloxypropyl-sulfonic acid, vinylsulfonic acid, p-styrenesulfonic acid and the like and mixtures thereof. Suitable cationic monomeric components include, but are not limited to, primary, secondary and tertiary amines such as aminoethylmethacrylate, methylaminoethylmethacrylate, N,N-dimethylaminoethylmethacrylate, N,N-diethanolaminoethylmethacrylate, N,N-dimethoxyethylamino-ethylmethacrylate, vinyl amine, aminostyrene, 2-vinyl pyridine, 4-vinyl pyridine, morpholinomethacrylate, N-(2-vinyloxyethyl) piperidine and the like and mixtures thereof; and quaternary ammonium compounds such as 2-trimethylammoniumethyl methacrylic hydroxide, 2-trimethylammoniumacrylic hydroxide, 2-trimethylammoniumethyl methacrylic chloride, 2-trimethylammoniummethylacrylic chloride, 2-methacryloyloxyethyltrimethylammonium methyl sulfate, 2 hydroxy-3 methacryloxyloxypropyltrimethylammonium chloride, and the like and mixtures thereof. Cationic-anionic monomeric component pairs include, but are not limited to, N-(3-sulfopropyl)-methacroyloxyethyl-N,-N-dimethylammonium-betain (SPE), N-(3-sulfopropyl)-N-methacrylamidopropyl-N,N-dimethylammonium-betain (SPP), 1-(3-sulfopropyl)-2-vinyl-pyridinium-betain (SPV), N-methacryloyloxyethyl-N,2-ethylcarboxybetain, N-(3-carboxypropyl)-N-methylaminoethylmethacrylate, N-(3-carboxypropyl)-N-methylaminomethacryloyloxyethyl-dimethylammonium-betain (CPE), N-(3-carboxypropyl) aminoethylmethacrylate, 2-(methacryloyloxy)ethyl-2-(trimethylammonium) ethylphosphate, and the like and mixtures thereof.

A monomer mixture is formed of a nonionic monomeric component, a charged monomeric component or a cationic-anionic monomeric component pair with at least one hydrophilic monomeric component, such as at least one ethylenically unsaturated hydrophilic monomeric component, including, but not limited to, 2-hydroxyethyl methacrylate (HEMA), hydroxypropylmethacrylate, vinylpyrrolidone, glycerylmethacrylate, acrylamide, and the like and mixtures thereof.

A cross-linking monomeric component preferably is also included in the monomer mixture. Examples of useful cross-linking monomeric component agents or components include, but are not limited to, ethylene glycol dimethacrylate (EGDMA) and diacrylate, diethyleneglycol dimethacrylate and diacrylate, 1,3-propanediol dimethacrylate and diacrylate, 2,2-dimethylpropanediol diacrylate, tripropylene glycol dimethacrylate and diacrylate, 1,3-butylene glycol dimethacrylate and diacrylate, divinylbenzene, sorbitol dimethacrylate, bis-acrylamide, and the like and mixtures thereof.

Polymerization of the monomer mixture is carried out using conventional techniques which are well known in the art. The first material can be formed into a lens blank using conventional techniques, such as molding, spin casting and the like. Since such techniques are well known to those of ordinary skill in the art, a detailed description thereof is not presented here.

The second material is other than the first material and is immobilized by the first material. The second material may be water soluble, for example, substantially uncross-linked; or may be water swellable, for example, a cross-linked polymeric material. Combinations of water soluble polymeric materials and water swellable polymeric materials are also useful as the second materials and are included within the scope of the present invention. The second material preferably is substantially not covalently bonded to the first material. The second material may include units derived from at least one hydrophilic monomer component, for example, at least one ethylenically unsaturated hydrophilic monomeric component. The monomeric components from which the second materials are derived, for example, the at least are ethylenically unsaturated monomeric component, preferably are soluble in at least one member selected from water, water misible solvents and mixtures thereof. Such solubility is particularly useful in producing the present second materials by solution polymerization, which is a preferred production technique, for example, as demonstrated in the Examples set forth hereinbelow.

In one embodiment, the monomeric components from which the second materials are derived, for example, the at least one ethylenically unsaturated hydrophilic monomeric component, are polymerizable to form linear or branched chain water soluble polymers or copolymers. Such water soluble polymer or copolymers are believed to be physically immobilized by the first polymer material by physical entanglements of the polymers or copolymers in the first material in what might be considered or termed a pseudo-interpenetrating network. Alternately, the monomeric components from which the second materials are derived, for example, the at least one ethylenically unsaturated hydrophilic monomeric component, are polymerizable, and cross-linkable, to form polymers or copolymers which are water swellable, and not water soluble. Such cross-linked, water swellable polymers or copolymers are believed to be physically immobilized by the first material in a true interpenetrating network. In any event, after hydration of the present compositions or lens bodies the polymers or copolymers of the second materials are held or immobilized by the first materials.

Hydrophillic monomeric components suitable for production of the polymers and copolymers immobilized within the first materials include, but are not limited to, hydrophillic vinylic monomers, such as vinyl ($C_4$–$C_{45}$) alkyl ethers, vinyl ($C_7$–$C_{49}$) alkenoic acids and the like and mixtures thereof; hydroxy substituted ($C_5$–$C_{45}$) alkyl, alkoxy-alkyl and polyalkoxy-alkyl and mono- or bi-cycloaliphatic fumarates, maleates, acrylates, methacrylates, acrylamides and methacrylamides, and the like and mixtures thereof; acrylic acid, methacrylic acid, the corresponding amino or mono- and di-(lower alkyl) amino substituted acrylic monomers and the like and mixtures thereof; and vinyl-lactams and the like and mixtures thereof. Typical monomers include, but are not limited to, 2-hydroxyethyl, 2-hydroxypropyl, and 3-hydroxypropyl acrylates and methacrylates; N-vinylpyrrolidone; N,N-dimethylaminoethyl methacrylate; methoxyethyl-, ethoxyethyl, methoxy-ethoxyethyl and ethoxy-ethoxyethyl acrylates and methacrylates; (meth) acrylamides like N,N-dimethyl, N,N-diethyl, 2-hydroxyethyl-, 2-hydroxypropyl-, and 3-hydroxypropyl acrylamides and methacrylamides; vinyl sulfonic acid; styrene sulfonic acid; 2-methacrylamide-2-methyl propane-sulfonic acid and the like and mixtures thereof. Many, if not all, of the hydrophilic monomers useful to produce the present first materials are also useful to produce the second materials, and vice versa.

In one embodiment, the second material preferably includes units derived from one or more of acrylic acid, hydrophilic derivatives of acrylic acid, methacrylic acid, hydrophilic derivatives of methacrylic acid, cationic/anionic pairs of monomeric components, cationic monomeric components, anionic monomeric components, nonionic monomeric components, hydrophilic vinylic monomeric components, salts thereof and mixtures thereof.

In the event the second material is to be water swellable, a cross-linking monomeric component is included in an amount effective to form a cross-linked second material which is water swellable.

Useful or suitable cross-linking monomeric components for inclusion in the monomers used to produce water swellable second materials may be selected from among such cross-linkers as are conventionally used, for example, in soft contact lens production. Examples of useful cross-linking monomeric components are set forth elsewhere herein.

Even if the second material is to be water soluble, rather than water swellable, it may be advantageous to increase the molecular weight of the second material to facilitate effective immobilization of the second material by the first material. In this circumstance, a chain extending, e.g., di-functional and/or tri-functional, monomeric component preferably is included in the monomers used to form the second material in an amount effective to increase the molecular weight of this material, as desired or to the desired extent.

Monomeric components suitable for modifying or increasing the molecular weight of the polymers or copolymers immobilized within the first materials include, but are not limited to, polyvinyl-, typically di- or tri-vinyl-monomers, such as di- or tri-acrylates and methacrylates; dihydric or higher hydric alcohol acrylates and methacrylates, such as ethyleneglycol-, triethylene glycol-, tetraethylene glycol-, propylene glycol-, butylene glycol-, hexane-1,6-diol-thio-diethylene glycol- and neopentyl glycol-diacrylates and dimethacrylates, neopentyl glycol diacrylate; trimethylolpropane triacrylate and trimethacrylate and the like; N,N-dihydroxyethylene-bisacrylamide and -bismethacrylamide; diallyl compounds such as diallylphthalate and triallyl cyanurate; divinylbenzene; ethylene glycol divinyl ether; and the like and mixtures thereof. Preferred such monomeric components include ethylene glycol dimethacrylate, diethylene glycol dimethacrylate, 1,4-butane diol di (meth) acrylate, neopentyl glycol diacrylate and the like and mixtures thereof.

The polymers or copolymers immobilized within the first material preferably are prepared by free-radical polymerization in solution and using heat-, redox- or UV-activated initiators.

Typical heat activated initiators include, but are not limited to, peroxides or azo catalysts having a half-life at the polymerization temperature of at least 20 minutes. Useful peroxy compounds include, but are not limited to, isopropyl percarbonate, tert-butyl peroctoate, benzoyl peroxide, lauroyl peroxide, decanoyl peroxide, acetyl peroxide, succinic acid peroxide, methyl ethyl ketone peroxide, tert-butyl peroxyacetate, propionyl peroxide, 2,4-dichlorobenzoyl peroxide, tert-butyl peroxypivalate, pelargonyl peroxide, 2,5-dimethyl-2,5-bis (2-ethylhexanoyl-peroxy)hexane, p-chlorobenzoyl peroxide, tert-butyl peroxybutyrate, tert-butyl peroxymaleic acid, tert-butyl-peroxyisopropyl carbonate, bis (1-hydroxy-cyclohexyl)peroxide and the like and mixtures thereof. Useful azo compounds include, but are not limited to, 2,2'-azo-bis-isobutyro-nitrile, 2,2'-azo-bis(2, 4-dimethylvaleronitrile), 1,1'-azo-bis (cyclohexane carbonitrile), 2,2'azo-bis(2,4-dimethyl-4-methoxyvaleronitrile) and the like and mixtures thereof.

Typical redox initiators include, but are not limited to, ammonium persulfate-sodium thiosulfate, potassium sulfate-Mohr's salt, and one or more peroxides with reducing agents such as sodium thiosulfate. Hydroxylamine hydrochloride, hydrazine hydrate, ascorbic acid, oxalic acid and citric acid are also suitable reducing agents for use in combination with oxidizing agents.

Typical UV (ultraviolet light)-activated initiators include, but are limited to, the photoinitiaters previously identified.

Other free radical generating mechanisms can be employed, such as X-rays, electron-beams and UV-radiation.

Methods for producing ophthalmic lenses or compositions, as described herein, include:

providing a lens body comprising a lens composition including a first polymer material, preferably a first cross-linked polymer material, which is water swellable, or providing a first polymer material, preferably a first cross-linked polymer material, which is water swellable. A monomeric component, preferably including a polymerization initiator component, as described elsewhere herein, is introduced into the lens body or the first material. The monomeric component preferably is soluble in at least one member selected from water, water miscible solvents and mixtures thereof. The monomeric component preferably is introduced into the lens body or the first material as a solution, for example, in water and/or water miscible solvents. The monomeric component in the lens body or the first material is exposed or subjected to effective conditions, that is effective polymerization conditions, to form a second polymeric material selected from water soluble polymeric materials, water swellable polymeric materials and mixtures thereof. The second material formed is immobilized, preferably physically immobilized, by the first material, for example, as described elsewhere herein.

The lens bodies, first materials and monomeric components useful to produce the second materials in accordance with the present methods are substantially as described elsewhere herein.

The conditions at which the second material is formed are selected so as to form the desired material. Such conditions may vary depending on the first material and monomeric component being employed, on the type (e.g. water soluble or water swellable) of second material desired, on the type of polymerization initiator used and on the like factors. Such conditions preferably are selected so that the first material is not substantially detrimentally affected.

Typical conditions include, but are not limited to, temperatures in a range of about 10° C. to about 100° C., preferably about 30° C. to about 80° C., polymerization times in a range of about 1 minute to about 48 hours, preferably about 5 minutes to about 45 minutes. Preferably, the polymerization occurs in an aqueous solution.

After the second material is formed, the lens body or the composition is preferably washed, with water and the like, to remove any unreacted monomeric component.

In one useful embodiment, the second material formed is substantially non-hydrophilic. In this instance, the formed second material preferably is converted, for example, by salt formation, into a hydrophilic second material. To illustrate, the formed material may be polymethacrylic acid which is exposed to alkali metal acid salt to form the corresponding alkali metal salt of polymethacrylic acid, a water soluble, hydrophilic material.

Compositions, for example, in forms other than ophthalmic lenses, which comprise a water swellable, first polymer material, preferably a first cross-linked polymer material, and a second material, other than the first material and polyacrylic acid, selected from water soluble polymeric materials, water swellable polymeric materials and mixtures thereof immobilized preferably physically immobilized by the first material are also included within the scope of the present invention. Such compositions, for example, such compositions which are hydrated, such as those compositions with substantially equilibrium water contents, are useful for various applications in the biomedical and pharmaceutical fields, such as in implant materials, catheters, drug delivery devices, etc. Such compositions preferably are effective or useful in the ophthalmic lenses of the present invention.

The following non-limiting Examples illustrate certain aspects and advantages of the present invention.

EXAMPLE 1

A series of contact lenses were cast in polypropylene molds by thermopolymerization of a monomer mixture including methacrylic acid, ethyleneglycol dimethacrylate, a thermal initiator and 2-hydroxyethyl methacrylate. The resulting lenses, which had a composition similar to Ocufilicon D, were utilized for further experiments.

EXAMPLE 2

Each of four contact lenses prepared according to Example 1 was immersed in 2 ml of an aqueous solution including 1% w/v NaCl and 0.1, 0.2, 0.4, and 0.6% w/v, respectively, of methacrylic acid in a 5 ml glass vial. The solution and lens in each of the vials were purged with oxygen free nitrogen for 1 minute, and then the vials were sealed. The vials were then placed in a 50° C. water bath and left to equilibrate for 15 minutes. Then 40 microliters of 5% w/v V-50 [2,2'-azobis(amidinopropane) dihydrochloride] initiator was injected through the septum in each vial using a Hamilton microsyringe. The vials were maintained in the 50° C. water bath for 30 minutes to effect polymerization of the methacrylic acid and then the polymerization was stopped by dropping the vials in an icy water bath.

The vials were opened and the lenses placed in extraction baskets in 1% w/v of $NaHCO_3$ solution for 30 minutes at 50° C. to transform the polymethacrylic acid produced during the polymerization in a sodium salt of polymethacrylic acid. The lenses were equilibrated in phosphate buffered saline at pH 7.2, autoclaved for 20 minutes at 120° C. and their water contents were determined.

Results of certain tests on the untreated lens and the treated lenses were as follows:

|  | Untreated Lens | 0.1% MAA | 0.2% MAA | 0.4% MAA | 0.6% MAA |
| --- | --- | --- | --- | --- | --- |
| Water content, by wt. | 50.9% | 54.2% | 56.9% | 59.0% | 61.0% |
| Dry weight gain | 0.0% | 3.0% | 3.5% | 5.0% | 6.5% |
| Base Curve [mm] | 8.40 | 8.60 | 8.80 | 8.90 | 8.95 |
| Diameter [mm] | 13.70 | 14.10 | 14.86 | 15.00 | 15.70 |

The above-noted treatments resulted in highly slippery contact lenses with increased water contents, for example, relative to the water contents of the untreated contact lenses. Water contents of the lenses before and after autoclaving and 60 minutes of boiling remained substantially the same indicating that a linear polymer of sodium polymethacrylic acid salt was permanently entrapped in the structures of the lenses.

EXAMPLE 3

Following the procedure described in Example 2, two contact lenses, made of crosslinked copolymer of hydroxyethyl methacrylate and methyl acrylate crosslinked with ethyleneglycol dimethacrylate (EGDMA) were treated with 0.1% w/v methacrylic acid solution and further evaluated for any change in mechanical characteristics. Both modulus and tensile strength of the treated lenses were about 30% greater than the untreated lenses.

EXAMPLE 4

Two lenses prepared according to Example 1 were each immersed in 2 ml of an aqueous solution containing 1% w/v of NaCl, and 3% w/v of sodium salt of sulfopropyl methacrylate (SPM) or 3% (w/v) N-(3-sulfopropyl)-methacroyloxyethyl-N,N-dimethyl ammonium-betain (SPE). The lenses were treated and processed the same way as described in Example 2 except that no $NaHCO_3$ was used. The treatments resulted in highly slippery lenses with permanently entrapped linear polymers of SPM and SPE.

EXAMPLE 5

Two lenses prepared according to Example 1 were each immersed in 2 ml of a deionized water solution of 5% w/v of diethyleneglycol methacrylate (DEGMA) or 5% (w/v) glycerol methacrylate (GMA). The lenses were treated and processed in the same way as described in Example 4. The treatments resulted in slippery lenses with permanently entrapped linear polymers of DEGMA and GMA.

EXAMPLE 6

Three lenses, designated Lens (A), Lens (B) and Lens (C), prepared according to Example 1, were each immersed in 2 ml of a deionized water solution of 5% w/v of diethyleneglycol methacrylate (DEGMA), and the lenses were treated and processed the same way as described in Example 4, except that modified polymerization conditions were employed as follows: Lens (A) 40 microliters of 5% (w/v) V-50 initiator was injected through the vial's septum using a Hamilton microsyringe and polymerization was carried out for 30 minutes at 50° C.; Lens (B) 20 microliters of 5% w/v V-50 initiator was injected through the vial's septum and polymerization was carried out for 2 hours at 50° C.; and Lens (C) 20 microliters of 5% w/v V-50 initiator was injected through the vial's septum and polymerization was carried out for 4 hours at 45° C.

Results of certain tests on the untreated lens and the treated lenses were as follows:

|  | Untreated lens | A | B | C |
|---|---|---|---|---|
| Water content, by wt. | 50.9% | 54.5% | 55.8% | 56.0% |
| Dry weight gain | 0.0% | 40% | 50% | 65% |
| Diameter (mm) | 13.7 | 15.9 | 18.0 | 18.5 |

All three treatments resulted in highly slippery lenses with significantly enlarged dimensions while the water content increased moderately relative to the untreated lens.

EXAMPLE 7

A series of contact lenses were cast in polypropylene molds by thermopolymerization of a monomer mixture including ethyleneglycol dimethacrylate, a thermal initiator and 2-hydroxyethyl methacrylate. The resulting lenses, which had a composition similar to Polymacon, were utilized for further experiments.

EXAMPLE 8

Three lenses prepared according to Example 7 were each immersed in 2 ml of a deionized water solution containing 0.5, 1.0, and 5.0% w/v, respectively, of methacrylic acid, in a 5 ml glass vial. Then 3 microliters of 10% w/v V-50 initiator was added to each of the vials. The solutions with the lenses were purged with oxygen-free nitrogen for 1 minute, and then the vials were sealed. The vials were then placed in a 40° C. water bath for 16 hours. The vials were opened and the lenses were placed in extraction baskets in 1% w/v of NaHCO$_3$ solution for 30 minutes at 50° C. The lenses were then equilibrated in phosphate buffered saline at pH 7.2, autoclaved 20 minutes at 120° C. and their water contents were determined.

Results of certain tests on the untreated lens and the treated lenses were as follows:

|  | Untreated lens | 0.5% MAA | 1.0% MAA | 5.0% MAA |
|---|---|---|---|---|
| Water Content, by wt. | 37.6% | 42.5% | 45.6% | 58.1% |
| Dry Weight Gain | 0.0% | 1.1% | 1.4% | 6.1% |

The above-noted treatments resulted in slippery contact lenses with increased water contents. Water contents of the lenses before and after autoclaving and 60 minutes of boiling in saline solution remained substantially the same, indicating that a linear polymer of sodium polymethacrylic acid salt was permanently entrapped in the structures of the lenses.

EXAMPLE 9

Three lenses prepared according to Example 7 were each immersed in 2 ml of a deionized water solution including 0.5, 1.0, and 5.0% w/v, respectively, of methacrylic acid, sodium salt in 5 ml glass vials. Then 3 microliters of 10% w/v V-50 initiator was injected into each of the vials. The solutions and the lenses were purged with oxygen-free nitrogen for 1 minute and the vials were sealed. The vials were then placed in a 40° water bath for 16 hours. Finally, the lenses were equilibrated in phosphate buffered saline at a pH of 7.2, autoclaved 20 minutes at 120° C. and their water contents were determined.

Results of certain tests on the untreated lens and the treated lenses were as follows:

|  | Untreated lens | 0.5% MAA, Na$^+$ | 1.0% MAA, Na$^+$ | 5.0% MAA, Na$^+$ |
|---|---|---|---|---|
| Water content, by wt. | 37.6% | 38.6% | 39.1% | 53.1% |
| Dry weight gain | 0.0% | 1.0% | 1.1% | 5.6% |

The above-noted treatments resulted in slippery contact lenses with increased water contents. Water contents of the lenses before and after autoclaving and 60 minutes of boiling in saline solution remained substantially the same, indicating that the linear polymer of sodium polymethacrylic acid salt was permanently entrapped in the structure of the treated lens.

EXAMPLE 10

Three lenses prepared according to Example 7 were each immersed in 2 ml of a deionized water solution of 0.5, 1.0, and 5.0% w/v, respectively, of N-vinylpyrrolidone in 5 ml glass vials. Then 3 microliters of 10% w/v V-50 initiator was injected into each of the vials. The solutions with the lenses were purged with oxygen-free nitrogen for 1 minute and the vials were sealed. The vials were then placed in a 40° C. water bath for 16 hours. The lenses were then equilibrated in phosphate buffered saline at a pH of 7.2, autoclaved 20 minutes at 120° C. and their water contents were determined.

Results of certain tests on the untreated lens and the treated lenses were as follows:

|  | Untreated lens | 0.5% NVP | 1.0% NVP | 5.0% NVP |
|---|---|---|---|---|
| Water Content, by wt. | 37.6% | 35.2% | 38.4% | 39.0% |
| Dry weight content | 0.0% | 1.3% | 1.5% | 1.6% |

The above-noted treatments resulted in slightly slippery contact lenses with increased water content. Water content of the lenses before and after autoclaving and 60 minutes of boiling in saline solution remained substantially the same indicating that the linear polymer of N-vinylpyrrolidone is permanently entrapped in the structure of the treated lenses.

EXAMPLE 11

Three lenses prepared according to Example 7 were each immersed in 2 ml of a deionized water solution of 0.45% w/v of SPE+0.05% w/v of HEMA, 0.9% w/v of SPE+0.1% w/v of HEMA, and 4.5% w/v of SPE+0.5% w/v of HEMA in 5 ml glass vials. The lenses were further treated as described in Example 10.

Results of certain tests on the untreated lens and the treated lenses were as follows:

|  | Untreated lens | 0.45 + 0.05% SPE + HEMA | 0.9 + 0.1% SPE + HEMA | 4.5 + 0.5% SPE + HEMA |
|---|---|---|---|---|
| Water content, by wt. | 37.6% | 42.5% | 45.0% | 46.0% |
| Dry weight gain | 0.0% | 13.1% | 17.4% | 37.8% |

EXAMPLE 12

Three lenses prepared according to Example 7 were each immersed in 2 ml of a deionized water solution of 0.5% w/v, 1.0% w/v and 5.0% w/v, respectively, of dimethylaminoethylmethacrylate+methacrylic acid (DMAEMA:MAA=2:1) in 5 ml glass vials. The lenses were further processed in the same way as described in Example 10.

Results of certain tests on the untreated lens and the treated lenses were as follows:

|  |  | DMAEMA + MAA | | |
|---|---|---|---|---|
|  | Untreated lens | 0.5% | 1.0% | 5.0% |
| Water content, by wt. | 37.6% | 42.5% | 45.0% | 46.0% |
| Dry weight gain | 0.0% | 13.1% | 17.4% | 37.8% |

EXAMPLE 13

A series of contact lenses were cast in polypropylene molds by thermopolymerization of a monomer mixture including methacrylic acid, ethyleneglycol dimethacrylate (EGDMA), initiator and 2-hydroxyethyl methacrylate. The resulting lenses, which had a composition substantially similar to Ocufilicon D had an equilibrium water content of 48% by weight. Such lenses were utilized for further experiments.

EXAMPLE 14

A number of contact lenses prepared according to the Example 13 were placed to dry to polypropylene baskets. The baskets with lenses were immersed to a stirred thermostated vessel containing 150 ml of a deionized water solution including 0.35% w/v methacrylic acid, 0.012% w/v EGDMA and 0.05% w/v sodium percarbonate. A vessel lid, furnished with a septum, was tightly closed on the vessel, and the vessel was purged with oxygen free nitrogen for 5 minutes. The lenses were equilibrated in the solution for 30 minutes at 30° C., then 1.5 ml of 5% w/v $Na_2S_2O_5$ (sodium metabisulfite) was charged into the vessel to initiate a redox free radical polymerization. When 30 minutes lapsed, a solution was decanted and replaced with an aqueous solution of 1% $NaHCO_6$. The lenses were maintained for 30 minutes in the sodium bicarbonate solution at 50° C. to convert the carboxylic groups into Na+ salt. The lenses were then equilibrated in phosphate buffered saline and their properties were evaluated.

The above-noted treatment resulted in slippery, optically clear, mechanically strong, contact lenses with 54% by weight water content.

EXAMPLE 15

A number of contact lenses prepared according to the Example 13 were placed to dry to polypropylene baskets. The baskets with lenses were immersed to a stirred thermostated vessel containing 150 ml of deionized water/20% w/v methanol solution including 0.35% w/v methacrylic acid and 0.012% w/v EGDMA. The vessel lid, furnished with a septum, was tightly closed on the vessel. The vessel was purged with oxygen free nitrogen for 5 minutes. The lenses were equilibrated in the solution for 30 minutes at 45° C., then 0.75 ml of 10% V-50 initiator was charged into the vessel. After 45 minutes, the lenses were processed the same way as in Example 13.

The treatment resulted in slippery, but slightly turbid, mechanically strong, contact lenses with 56% by weight water content.

EXAMPLE 16

A number of contact lenses prepared according to the Example 13 were placed dry to polypropylene baskets. The baskets with lenses were immersed to a stirred thermostated vessel containing 150 ml of a deionized water solution including 0.35% w/v methacrylic acid, 0.012% w/v % EGDMA and 0.28% w/v (sodium persulfate or $Na_2S_2O_8$). The vessel lid, furnished with a septum, was tightly closed on the vessel. The lenses were equilibrated in the solution for 30 minutes at 30° C., then 1.5 ml of 5% w/v ($Na_2S_2O_5$ or sodium metabisulfite) aqueous solution was charged into the vessel. After 30 minutes, the lenses were processed in substantially the same way as in Example 13.

The treatment resulted in slippery, clear, mechanically strong, contact lenses with 52% by weight water content.

While this invention has been described with respect to various specific examples and embodiments, it is to be understood that the invention is not limited thereto and that it can be variously practiced with the scope of the following claims.

What is claimed is:

1. A composition comprising:
   a first crosslinked polymer material, the first crosslinked polymer material swelled with water; and
   a second polymeric material, other than the first crosslinked polymer material and polyacrylic acid, selected from the group consisting of water soluble polymeric materials, water swellable polymeric materials and mixtures thereof, the second polymeric material being physically immobilized by the first crosslinked polymer material.

2. The composition of claim 1 which has a reduced coefficient of friction relative to a substantially identical composition without the second polymeric material.

3. The composition of claim 1 wherein the second polymeric material is crosslinked.

4. The composition of claim 1 wherein the second polymeric material is selected from the group consisting of water soluble polymeric materials and mixtures thereof.

5. The composition of claim 1 wherein the second polymeric material is nonionic, anionic or a material having a substantially balanced cationic/anionic charge.

6. The composition of claim 1 wherein the first crosslinked polymer material is present in an amount in a range of about 10% to about 99.9% by weight of the total of the first crosslinked polymer material and the second polymeric material present, and is selected from the group consisting of hydrogel-forming polymers and mixtures thereof.

7. The composition of claim 1 wherein the second polymeric material is substantially not covalently bonded to the first crosslinked polymer material.

8. The composition of claim 1 wherein the second polymeric material includes units derived from at least one ethylenically unsaturated monomeric component.

9. The composition of claim 1 wherein the second polymeric material is selected from the group consisting of water swellable polymeric materials and mixtures thereof.

10. A composition comprising:
    a first crosslinked polymer material, the first crosslinked polymer material swelled with water; and
    a second polymeric material, other than the first crosslinked polymer material, which is nonionic, cationic or a material having a substantially balanced cationic/anionic charge, and is selected from the group consisting of water soluble polymeric materials, water swellable polymeric materials and mixtures thereof, the second polymeric material being physically immobilized by the first crosslinked polymer material.

11. The composition of claim 10 which has a reduced coefficient of friction relative to a substantially identical composition without the second polymeric material.

12. The composition of claim 10 wherein the polymeric second material is crosslinked.

13. The composition of claim 10 wherein the second polymeric material is selected from the group consisting of water soluble polymeric materials and mixtures thereof.

14. The composition of claim 10 wherein the first crosslinked polymer material is present in an amount in a range of about 10% to about 99.9% by weight of the total of the first crosslinked polymer material and the second polymeric material present, and is selected from the group consisting of hydrogel-forming polymers and mixtures thereof.

15. The composition of claim 10 wherein the first crosslinked polymer material includes units derived from at least one ethylenically unsaturated monomeric component.

16. The composition of claim 10 wherein the second polymeric material is substantially not covalently bonded to the first crosslinked polymer material.

17. The composition of claim 10 wherein the second polymeric material includes units derived from at least one ethylenically unsaturated monomeric component.

18. The composition of claim 17 wherein the at least one ethylenically unsaturated monomeric component is polymerizable to form a linear or branched chain water soluble polymer or copolymer.

19. The composition of claim 10 wherein the second polymeric material is selected from the group consisting of water swellable polymeric materials and mixtures thereof.

* * * * *